Oct. 9, 1951     J. E. LUNDBERG ET AL     2,570,826

ERROR COMPENSATOR

Filed Nov. 15, 1949     3 Sheets-Sheet 1

Inventors:
John E. Lundberg,
George A. Wallace,
by *Prowell & Mack*
Their Attorney.

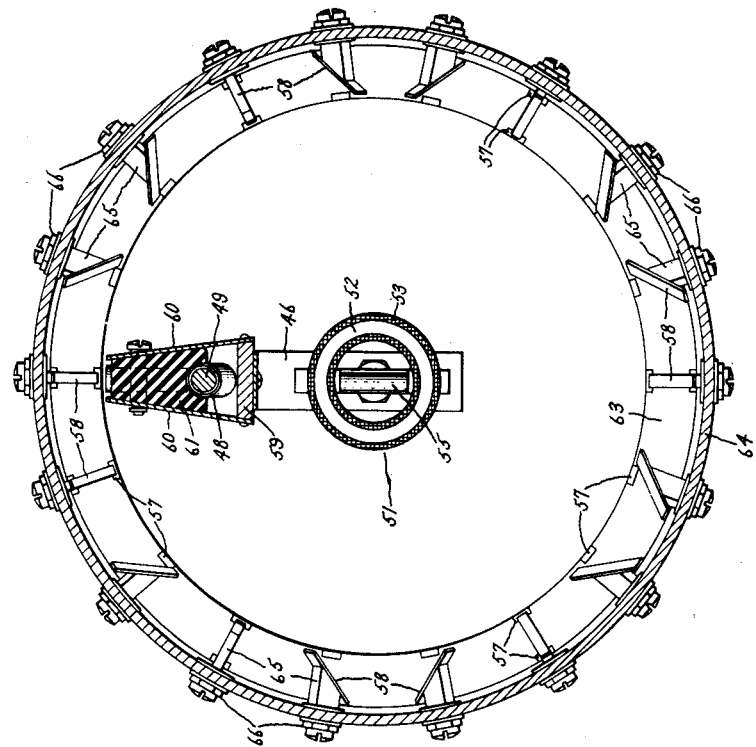
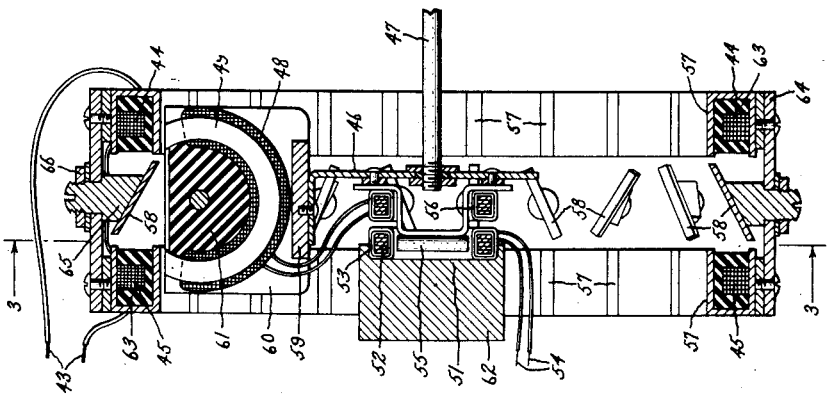

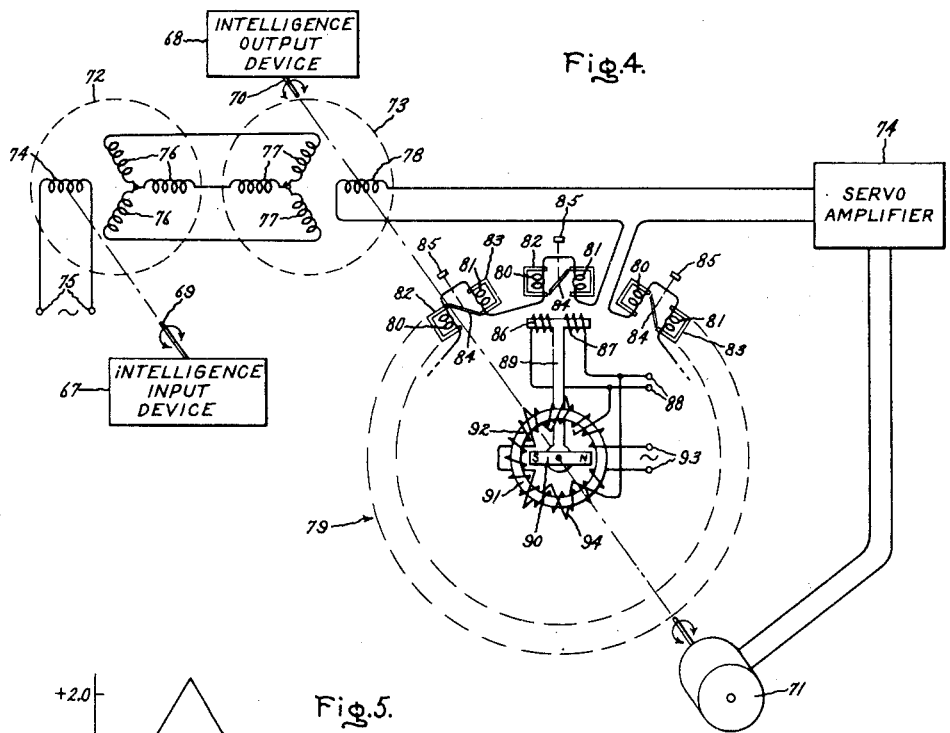
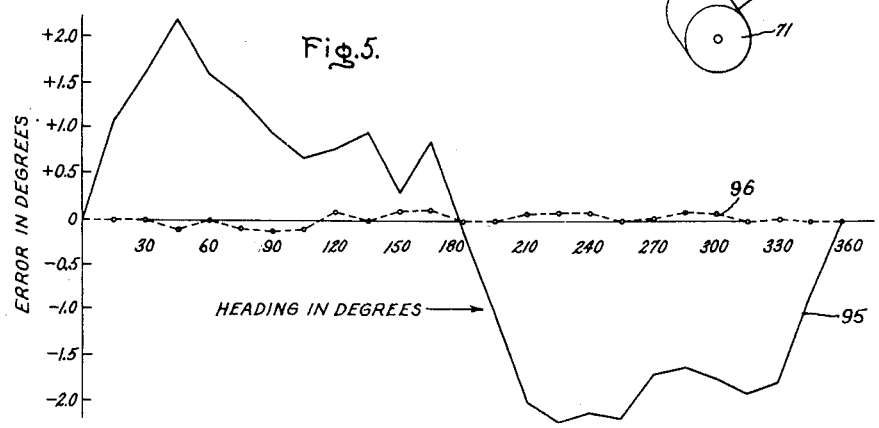
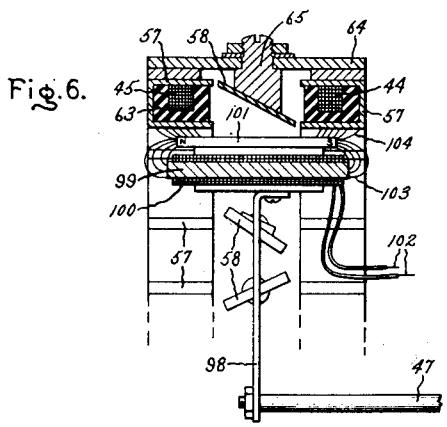
Inventors:
John E. Lundberg,
George A. Wallace,
by [signature]
Their Attorney.

Patented Oct. 9, 1951

2,570,826

UNITED STATES PATENT OFFICE 2,570,826

ERROR COMPENSATOR

John E. Lundberg, Lynn, and George A. Wallace, Malden, Mass., assignors to General Electric Company, a corporation of New York Application November 15, 1949, Serial No. 127,424

16 Claims. (Cl. 33—222)

The present invention relates to telemetering and control arrangements and, more particularly, to improved telemetric and control systems wherein errors are minimized.

In electrical circuit arrangements wherein a predictable error in a certain intelligence signal occurs, it is known that compensation therefor may be achieved by the insertion of an appropriate corrective signal having predetermined characteristics such that the combined intelligence and corrective signals will produce substantially the same results which would obtain from the intelligence signal alone if it were without error. This invention, however, is concerned with the minimizing of errors ensuing from all sources, mechanical and electrical, in electromechanical systems, particularly those control and telemetering arrangements wherein the angular orientation of a rotatable member represents an intelligence indication.

Particularly advantageous utilization of the subject invention, though not limited thereto, occurs in cooperation with a compass-controlled directional gyroscope arrangement, and the principles thereof may be readily comprehended with reference to such a combination. It should be appreciated by those skilled in the art that where a directional gyroscope is corrected in its azimuth indications by a torque motor responsive to signals which represent the difference between the gyroscope and magnetic compass headings, numerous errors of both mechanical and electrical origin may operate to prevent the indications or control signals derived from the combination from being highly accurate. Further, these inaccuracies may be of variable magnitude and sense for each of the angular positions within the 360 degrees of azimuth indications or signals supplied by the compass-controlled directional gyro system. In accordance with the present invention, these errors may be rendered of negligible influence upon the system output by an entirely automatic compensation therefor accomplished by the proper introduction of corrective signals of such magnitude and phase that the system output signal for any azimuth heading will be of substantially the theoretically precise value. The compensation signals are produced by an arrangement which automatically delivers an electrical signal of predetermined phase and amplitude when a particular magnetic compass heading obtains, and this signal is injected into the compass-controlled gyro system such that the output therefrom is corrected for all errors. In other system embodiments, as will appear hereinafter, the compensator arrangement may be responsive to elements other than the magnetic compass with similar results. A compensator which is adjustable to deliver any desired number of compensation signals, each independently variable in phase and magnitude, may be produced in accordance with this invention. Details of other compensation arrangements may be observed with reference to the patent of John E. Lundberg and Robert G. Ballard for a Deviation Compensator, Number 2,519,058, issued August 15, 1950.

One object of the present invention, therefore, is to provide a novel error compensator for automatically minimizing errors in telemetering and control systems.

A second object is to provide an error compensation device for compass-controlled directional gyroscope systems wherein compensation signals are produced when the elements of the compensator have a predetermined angular orientation and wherein the signals are made independently variable in phase and magnitude by adjustment of flux-conducting paths.

Further, it is an object to provide an error compensator device having only two output coils and adjustable to produce a plurality of output signals of independently variable phase and amplitude for predetermined angular orientations of a rotatable element of the device.

These and other objects and features of the subject invention are disclosed in detail in the following description wherein reference is made to the accompanying drawings, in which:

Fig. 2 represents a longitudinal cross-section of a preferred embodiment of an error compensator device;

Fig. 3 shows the transverse cross-section of the error compensator device of Fig. 2 taken along the section line 3—3;

Figure 1:
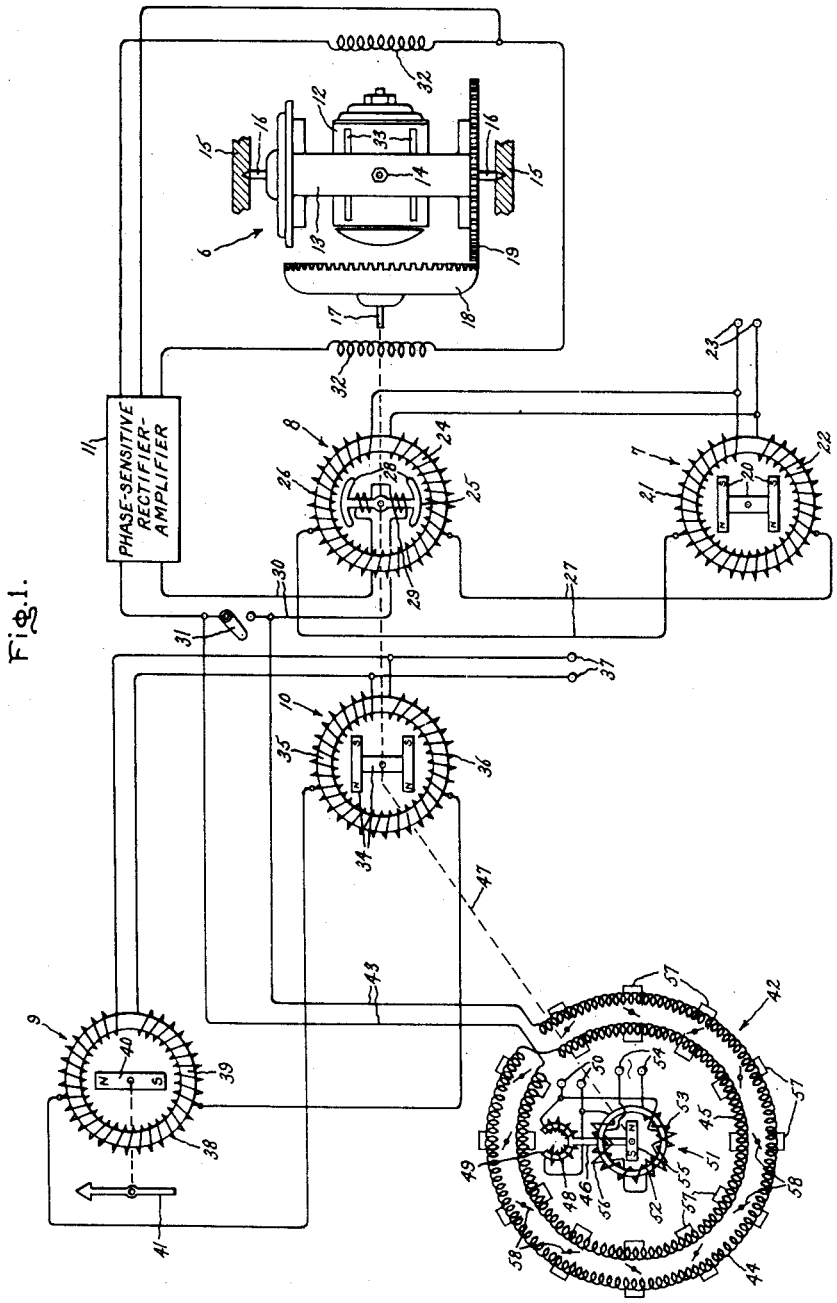
Fig. 1 illustrates, partly in schematic and partly in pictorial form, a compass-controlled directional gyroscope system including the error compensator of the present invention.

Fig. 4 presents a schematic and pictorial view of an additional error compensator system embodiment;

Fig. 5 graphically depicts representative curves of the output indications from compensated and uncompensated compass-controlled directional gyroscope systems; and Fig. 6 illustrates, in partial showing, another preferred embodiment of an error compensator device.

In conventional telemetering, indicating or control arrangements, the output signals may be at considerable variance with the theoretical values thereof, because of electrical and mechanical errors of the individual elements of the system and because the total system accuracy is the composite accuracy of the individual system elements. As previously set forth, these errors may be eliminated by a deviation compensator which automatically introduces a correction signal when required. Fig. 1 shows this accomplished in a compass-controlled directional gyroscope system which comprises the conventional elements, including a directional gyroscope 6, remotely mounted magnetic compass transmitter 7, electrical detector Selsyn 8, remote indicator 9, transmitter 10, and phase-sensitive rectifier-amplifier 11.

The directional gyroscope 6 comprises a rapidly spinning rotor, not shown, mounted in the frame 12 which is pivotally supported in the gimbal 13 by means of trunnions 14. Gimbal 13 is, in turn, supported pivotally with respect to the outer frame 15 by trunnions 16. Shaft 17 indicates the angular position of the gyroscope by its own angular orientation, which is established by the attached cup gear 18 driven by the gear 19 mounted on the gimbal 13. The remote magnetic compass transmitter 7 includes a pair of rotatable magnetic elements 20 which aligns itself with the horizontal component of the earth's magnetic field, and a uniformly distributed exciting winding 21 wound upon a stationary annular core, 22, of permeable magnetic material such as "Permalloy." Winding 21 is energized by a suitable source of alternating current, the supply terminals of which are represented by numeral 23, and the core 22 is arranged to be saturated periodically by the alternating current flowing in the exciting winding such that the magnetic flux from the compass magnetic elements 20 flowing in the core 22 is caused to pulsate and produce induced second harmonic voltages in the winding 21. Detector unit 8, which is essentially a polyphase Selsyn, comprises a stationary annular stator 24 of magnetic material, which may be coupled with frame 15 of the gyroscope, and a coaxially positioned rotor 25, which is coupled for rotation with the output shaft 17 of gyroscope 6. A toroidal winding 26 is arranged upon the detector rotor 25 and is also connected with the alternating current supply terminals 23. The compass transmitter and detector unit windings are provided with corresponding taps and polyphase connections 27 which symmetrically interconnect the windings electrically, whereby an alternating current flux is produced across the diameter of detector core 24, the axial direction of this flux varying in accordance with the orientation of the compass magnets relative to the transmitter stator. Detector rotor 25, constructed of magnetic material, forms a path for the second harmonic flux traversing the stator core diameter, and is shown to have arcuate pole pieces 28 which assist in collecting the stator flux. Practically, the stator core might also include salient pole pieces, not illustrated, to further assist passage of the second harmonic flux by the provision of a low-reluctance magnetic path. A single phase detector rotor coil 29 is wound upon rotor 25 and delivers alternating current signals directly to the phase-sensitive rectifier-amplifier 11 through leads 30 when switch 31 is closed.

Direction or azimuth heading of the supporting aircraft is obtained from the angular orientation of the gyroscope output shaft 17 which is rotated by cup gear 18 when the aircraft maneuvers to various headings with respect to the gyro rotor axis and gimbal 13. However, since a directional gyroscope tends to wander or drift slowly from a predetermined compass direction because of the earth's rotation, friction of the gimbal bearings, and other influences, a torque motor is utilized to overcome this difficulty by continuously precessing the gyro to maintain the spin axis thereof in predetermined relationship with the magnetic meridian as measured by the magnetic compass 7. Precession is accomplished by the torque motor windings 32 in cooperation with other elements, which may, for example, include magnets 33 mounted in the gyro rotor frame 12. Direct currents passed through the windings 32 from the phase-sensitive rectifier-amplifier 11 produce magnetic fields which interact with the fields from magnets 33 such that the desired precessing torque is applied to the gyro about the horizontal gimbal axis. The polarity and magnitude of these direct currents depend upon the polarity and magnitude of the alternating current signals applied to the rectifier-amplifier from the detector unit 8, the construction of such devices being well known to those versed in the art. Since the axis of the detector rotor 25 is initially set perpendicular to the detector stator flux axis while the gyro spin axis is in compass correspondence with the magnetic compass magnets such that the alternating current across the detector output leads 30 remains zero, any turning of the compass magnets relative to the aircraft in response to aircraft maneuvering that is accompanied by corresponding rotation of the gyroscope relative to the instrument frame will result in zero signal output from the detector rotor. However, upon any departure of the gyro spin axis from the predetermined relationship with respect to the compass magnets, an alternating current error signal will appear, in detector output leads 30, which is of a phase and magnitude to cause rectifier-amplifier 11 to deliver the appropriate direct current to the torque motor. Thereupon, the gyroscope spin axis is precessed to the correct heading, and detector rotor 25 is oriented such that it produces zero signal alternating current output.

A remote indicator 9 may operate to deliver indications of the craft heading which will be devoid of the short period oscillations of the magnetic compass and of the longer period errors of an uncompensated directional gyroscope. This is facilitated by the indicator transmitter 10, having a rotor 34 coupled with the gyro shaft 17. The rotor 34 is comprised of magnetic elements, and the transmitter stator includes a saturable core 35 and toroidal coil 36 similar to the compass transmitter coil. Coil 36 is excited by a source of alternating current, represented by terminals 37, and is connected in parallel with a corresponding polyphase coil 38 mounted upon stator core 39 of the remote indicator. In conventional fashion, voltages established in transmitter coil 36 produce a field across the indicator coil 38 which drives the indicator rotor magnet 40, and pointer 41 coupled therewith, into correspondence with the angular position of the transmitter rotor magnet assembly 34.

To the system as described thus far, a deviation compensator device 42 is added to compensate for errors in azimuth indications resulting from errors in the several system components and installation and other factors. Because of the various errors encountered in the compass-controlled directional gyroscope system, it should be recognized that the gyroscope output shaft may not always be in exact correspondence with the magnetic compass heading even though the output of the electrical detector 8 is zero. It is therefore the function of the compensator device to apply to the phase-sensitive rectifier-amplifier 11 corrective signals of such phase and magnitude that the gyroscope spin axis will be precessed to the proper heading when the gyroscope output shaft bears predetermined angular orientations which, because of the system errors, would not cause the detector 8 to yield the appropriate output voltages to accomplish this precession. Fig. 1 illustrates the series connection of the output from the compensator output leads 43 with the output of the detector leads 30, when switch 31 is open, to facilitate this introduction of the compensator signals into the system.

The compensator device 42 comprises an alternating flux generating arrangement, output coils having voltages induced therein by the alternating flux, and independently adjustable means for controlling the flux paths, thereby determining the phase and magnitude of the compensator output signals for any angular orientation of the gyroscope output shaft 17. This device is shown to include two serially-connected annular windings 44 and 45, which are preferably coaxial, of the same diameter, and separated from one another by a short air gap. Rotatable about the central axis of these windings is a rotor member 46 coupled with the gyroscope output shaft 17, as indicated by the dashed line 47. Attached to, and rotatable with one end of the rotor member 46 is an alternating flux distributing arrangement including a winding 48 and open-ended core 49 which cause alternating flux to induce voltages in the annular windings 44 and 45. Preferably, though not necessarily, the rotatable core 49 is U-shaped such that each of the open ends thereof is disposed proximately with one of the annular windings, and these windings are arranged such that the voltages induced therein would be equal and opposite except for influences hereinafter described.

Winding 48, which produces alternating flux through rotatable core 49 and across its air gap, is preferably energized by alternating current having the same frequency as the second harmonic error voltages which appear in the output of the electrical detector 8. Thus the compensator output signals in windings 44 and 45 and in leads 43 will be of this same frequency to which the phase-sensitive rectifier-amplifier 11 is designed to be responsive, and the gyroscope torque motor will be actuated accordingly. Where a source of voltage of the desired frequency is conveniently located, terminals 50 of winding 48 may be energized therefrom; otherwise, a second harmonic signal generator 51 may supply the excitation to the winding. Generator 51 comprises a core 52 of saturable material, a primary winding 53 wound upon the core and excited from the terminals 54 of a fundamental frequency alternating current source, a permanent magnet 55, and a secondary winding 56 which may be wound on the generator core or closely associated therewith. Secondary winding 56 has second harmonic voltages induced therein by the second harmonic flux set up by the generator primary coil and magnet, and these voltages are applied to the rotatable winding 48.

It is important that the second harmonic flux across the air gap of the rotatable core 49 induce voltages in the annular windings 44 and 45 which will combine to produce a resultant signal of predetermined phase and amplitude for predetermined angular orientations of the compensator rotor 46 and the gyro output shaft coupled therewith. As set forth thus far, the serially-connected output windings 44 and 45 are arranged to have voltages of equal magnitude and opposite phase induced therein by the alternating flux, and the resultant output signal will always be zero. However, at each of those angular positions of the compensator rotor 46 where an error compensating signal output is desired, a flux path control arrangement is provided to adjust the magnitude of the alternating flux which links each winding and, thereby, to control the phase and amplitude of the resultant of the signals from these windings. The flux control arrangements each comprise a pair of substantially U-shaped low reluctance flux bands 57 and a low reluctance flux bridge 58. Each flux band is fitted about one of the output windings and the open ends of each pair of bands are disposed opposite one another across the gap between the output windings. Intermediate the flux bands of each pair is a rotatably adjustable flux bridge 58 which provides an adjustable low reluctance path between diagonally opposite ends of oppositely disposed flux bands. The alternating flux from the open ends of the rotatable core 49 flows between each of these ends and the proximately positioned leg of one of the U-shaped flux bands. Therefore, the alternating flux may be made to flow about either of the output windings, depending upon which opposite ends of the flux bands are coupled by the flux bridge, and the magnitude of this flux is a function of the air gap between the flux bridge and flux band ends. It follows that, for any position of the rotatable member 46 opposite a pair of flux bands, the phase and magnitude of the compensator output signals is variable with the adjustment of the corresponding flux bridge.

Fig. 2 illustrates one embodiment of a compensator device such as 42 of Fig. 1, and Fig. 3 represents the same embodiment viewed along section line 3—3 of Fig. 2. For convenience in an understanding of the description of this device, the elements corresponding to those previously mentioned with reference to Fig. 1 have been assigned the same numerals. Thus, shaft 47 in Fig. 2 is coupled with the rotatable output shaft 17 of the gyroscope, not shown in this figure, and carries the attached rotor member 46 with it in its angular travel. Rotatable core 49 and the surrounding coil 48 are affixed to rotor member 46 by a member 59 which is fastened to flux deflecting vanes 60 which in turn are connected with the spacer block 61 to which the core and coil are attached. It is important to optimum performance of the subject compensator device that the flux emanating from the ends of the U-shaped rotor core 49 be controlled in the extent to which the flux is concentrated near these core ends, and it has been found that the soft iron deflector vanes 60 accomplish the desired concentration. The alternating current generator 51 which excites coil 48 to produce alternating flux of the proper frequency from core 49 is illustrated as comprising a primary stator core 52 and winding 53 energized from leads 54 and attached to a stationary element 62. Secondary winding 56 is positioned close to the primary winding and is rotatable, together with permanent magnet 55, with the rotor member 46 to which it is secured. Second harmonic voltages are induced in secondary winding 56 in accordance with principles well-known to those skilled in the art, and slip rings are not required to accomplish energizing of the coil 48.

Annular output coils 44 and 45 are preferably set into insulating forms 63 which are rigidly held by a stationary non-magnetic cylindrical frame 64. At predetermined angular positions, channel-shaped low reluctance flux bands 57 are fitted about the windings and arranged such that the open ends of corresponding flux bands are oppositely disposed across the air gap between the spaced windings. A flux bridge 58 of flux-conducting material is also mounted in the cylindrical frame 64 at each angular position corresponding to that at which a pair of flux bands is located. Each flux bridge is located in the air gap between the windings and is supported on the interior of the frame by a high reluctance stud 65 which extends through the frame, is rotatable with respect thereto, and which may be rigidly locked therewith by means such as a locknut 66. The angular inclination of the flux bridge element with reference to the longitudinal axis of the supporting stud is selected such that the bridge ends may in certain positions extend to within a very short distance of the open ends of opposite flux bands which are furthest removed.

The compensator of Figs. 2 and 3 provides an output signal which may be varied in phase and magnitude at each of eighteen positions or stations as the gyroscope output shaft rotates through 360°. Compensator shaft 47 assumes a predetermined angular orientation for any predetermined orientation of the gyroscope output shaft with which it is coupled, and the rotor U-shaped core 49 is positioned accordingly. Alternating flux is caused to flow from the open ends of this core by the alternating current circulating in the core winding 48, and this flux is concentrated into a narrow band by the deflector vanes 60. In certain designs, when the core ends are disposed opposite portions of the output windings 44 and 45 which are not provided with flux bands, the voltages induced in these windings by the alternating flux may be made substantially equal in amplitude and opposite in phase, and the serially-connected windings would produce no effective output signal in the compensator output leads 43. However, when the core ends are disposed near or directly opposite a pair of flux bands the amplitude of voltage induced in each of the windings depends upon the amount of flux which is intercepted by each winding, that is, depends upon the angular setting of the corresponding flux bridge. Because the annular windings are serially connected and have voltages of opposite phase induced therein, any variation in the amplitude of voltage induced in one winding relative to the other by orientations of the flux bridge near a particular pair of flux bands not only changes the magnitude of the compensator output signal but its resultant phase as well. As previously mentioned, it may be possible to eliminate any compensator output voltage when the flux-distributing core is disposed opposite portions of the output windings having no flux bands thereabout, but, practically, the stations at which the bands and flux bridges are located may be so close to one another that they may also serve to control those voltages induced in the output windings when the distributing core is between stations. Such action may be advantageously utilized to accomplish production of desired compensator voltages at all positions of the flux-distributing core rather than only when it is substantially opposite a station. It may, in fact, be desirable to adjust all stations, by means of the corresponding flux bridges, such that voltages between stations are of the optimum values commensurate with satisfactory voltages being produced at the stations themselves. Thus, in a compass-controlled directional gyroscope system such as that of Fig. 1, the gyroscope may be caused to assume the same azimuth headings as the magnetic compass at all times merely by an initial adjustment of the compensator flux bridges such that the compensator output signals will displace the gyroscope spin axis in directions and to extents appropriate to overcome the errors in azimuth headings thereof.

An intelligence-conveying system in which errors are rendered negligible in conformity with the subject invention is illustrated in Fig. 4 wherein the intelligence input device 67 and intelligence output device 68 correspond to the magnetic compass and gyroscope, respectively, of the system of Fig. 1. Input device 67 and output device 68 each have a rotatable member, 69 and 70 respectively, whose angular orientations convey intelligence, and these devices may comprise the conventional input and output elements of systems such as data transmission and servo systems. It is apparent that, when the input shaft 69 is rotated to any angular position, the output shaft 70 must be correspondingly rotated by the servomotor 71 coupled therewith. This is accomplished by the transmitter unit 72, detector unit 73, and servo amplifier 74. These transmitter and detector units may comprise a second harmonic transmitter and detector arrangement well known in the art, or may, as shown, comprise a Selsyn generator and control transformer combination. Coupled for rotation with input shaft 69 is the Selsyn generator rotor 74 which is excited from alternating current supply terminals 75 and which induces in the coils of the generator stator 76 voltages characteristic of the rotor orientation. These stator coil voltages, when transferred to the stator coils 77 of a Selsyn control transformer, produce a combined field having the same direction as the generator rotor field, and any lack of correspondence between the control transformer rotor 78 and the generator rotor 74 results in an output signal from rotor 78 which is representative of this error in phase and magnitude. Control transformer rotor 78 is coupled with output shaft 70 and motor 71 such that error signals therefrom, applied to the servo amplifier 74, are indicative of any such lack of correspondence. It should be recognized that these rotor output signals are of the same fundamental frequency as the voltages energizing the generator rotor 74, hence, the error compensator device 79 utilized with this system would be arranged to deliver corrective signals having the same fundamental frequency.

Compensator 79 is illustrated with only a portion of the pick-up winding structure, this structure being inclusive of a plurality of serially coupled stations distributed to form a substantially closed circle. Each station comprises a pair of serially connected windings, 80 and 81, whose induced voltages are in phase opposition, a pair of substantially U-shaped flux bands, 82 and 83, each one of which encloses one winding on three sides and has its open ends disposed opposite the open ends of the other across the gap between the windings, and a flux bridge 84 positioned in the gap and adjustably oriented by adjusting means 85 to provide variable low reluctance flux paths from one end of one flux band diagonally across to the other end of the opposite flux band. The alternating flux which induces voltages in the output windings 80 and 81 of each station is produced by the combination of a magnetic core 86 and winding 87 thereon energized from alternating current terminals 88, which combination is carried by the compensator rotor 89 coupled for rotation with the output shaft 70 and motor 71. In those applications where the transmitter 72 and detector 73 are of the second harmonic type, the alternating flux produced in the compensator should be of the same frequency, and the generating arrangement to be described may be employed. This arrangement includes a fixedly positioned permanent magnet 90, a fixedly positioned annular saturable core 91 surrounding the magnet, an excitation winding 92 on the core energized from fundamental frequency alternating current supply terminals 93, and an output winding arrangement 94 on the core 91 connected to the rotor flux winding 87 and eliminating the need for excitation from terminals 88. Fundamental frequency voltages induced in the output winding arrangement 94 by winding 92 are cancelled because this arrangement includes a pair of oppositely wound coils, one on each half of the annular core, whereas the second harmonic voltages in these coils are additive and result from the variations in flux, from the permanent magnet 90, which flows through each half of the core as the degree of saturation thereof changes with the instantaneous values of the voltage in the primary winding. Since the orientation of the magnet 90 relative to the annular coil 91 must remain fixed, these elements may both be attached to the rotor 89 and the input terminals 93 may be coupled with slip rings, not shown, or, these elements may be separate from the rotor and the output winding 94 may be coupled with winding 87 through slip rings also not illustrated.

When intelligence input device 67 has rotated the input shaft 69 and the rotor of transmitter 72 to any angular position, detector 73 produces an output signal substantially representative, in phase and magnitude, of the direction and extent of lack of correspondence between the input shaft and output shaft 70 of the intelligence output device 68. This output signal is applied to a servo amplifier 74 which in turn actuates the motor 71 which rotates the output shaft 70 and detector rotor to the position where no further detector output signal obtains and where correspondence between input and output shafts 69 and 70 should exist. Practically, however, the system errors arising from both mechanical and electrical inaccuracies invariably prevent precise correspondence and preclude automatic actuation of the output shaft to the position where it will be aligned with the input shaft to the desired extent. Compensator device 79 overcomes these disadvantages by delivering output signals in series with the detector output, which compensator signals may be adjusted in both phase and magnitude for any predetermined orientation of the compensator rotor in the manner previously set forth. The effect of these compensator signals is to shift the null point of the detector, as seen by the amplifier, in a direction depending upon the phase of the compensator voltage and by an amount depending upon the magnitude of the compensator voltage. Repetition of the points about the compensator circumference at which the output voltages may be controlled makes it possible for the output shaft to agree with, or follow, the input shaft orientations within narrow limits throughout the full 360 degrees of possible rotation thereof.

Fig. 5 is representative of the errors which may appear in a compensated and uncompensated system for obtaining correspondence between the angular positions of two rotatable members, and the data for these plots was derived from a compass-controlled directional gyroscope system. Solid-line plot 95 indicates the error in degrees of the detector heading as the magnetic compass transmitter was rotated to successive 15 degree positions and the detector turned to a corresponding null or zero output orientation. The compensator device was not included in this system for the determination of curve 95, and it should be observed that errors of a magnitude of over ±2 degrees obtained. Dashed-line plot 96 depicts the resultant error after compensation was introduced by a compensator device having stations at 15 degree points, and errors of only ±0.1 degree appeared. If desired, adjustment of the flux bridge at each station may be made such that errors between stations are also minimized and not merely reduced to zero at the stations where the flux bridges and bands are located.

It should be apparent that the foregoing embodiments are susceptible of numerous modifications and variations within the scope of the present invention. Thus, in the arrangement of Fig. 4, it is contemplated that the rotor of the compensator device 79 may be coupled with the shaft 69 of the intelligence input device 67, rather than with the output shaft 70, with comparable advantageous results. Additionally, in connection with the compensator unit itself, it is obvious that the design of the flux bridges and flux bands may be altered, that any number of stations with any desired distribution thereof may be employed, and that the compensator output windings may be connected other than serially and need not be of the same diameter. The compensator rotor flux-distributing core and coil may be of any suitable configuration and mounted to the rotor in any convenient manner, and the flux-deflecting rotor vanes may be eliminated in certain applications. Where second harmonic compensator flux is not required to produce second harmonic compensator output signals, the generator arrangement may be dispensed with and the flux-distributing coil may be energized from a fundamental frequency source.

It may also be desirable that the second harmonic generator, when required, shall further serve as a flux-distributing element, and Fig. 6 illustrates this arrangement in a compensator device similar to that of Fig. 2, with corresponding components bearing the same numerals. Annular output coils 44 and 45 set into insulating forms 63 and held by the cylindrical frame 64 are viewed in a partial vertical section through the axis of rotation of the rotor shaft 47, flux bands 57 and flux bridges 58 being visible. Attached to the rotor shaft 47 is a rotor arm 98 which carries a saturable core 99, surrounding coil 100, and permanent magnet 101. Leads 102 deliver alternating current of a fundamental frequency to coil 100 and periodic saturation of core 99 occurs. Magnetic flux 103 from permanent magnet 101 flows through core 99 during those portions of the A. C. cycle when the core is not saturated, but, at the peaks of the cycles, when core saturation obtains and the reluctance of the core path becomes high, most of the flux, 104, passes through one or the other of flux bands 57 and flux bridge 58 and thereby one or the other of the windings 44 or 45 depending upon the adjustment of 58 to induce the desired voltages in such winding. Since the core 99 becomes saturated twice during each cycle of the excitation of coil 100, the compensator output voltages are of twice the frequency of the excitation voltage.

While particular embodiments of the subject invention have been shown and described herein, these are in the nature of description rather than limitation, and it will occur to those skilled in the art that various changes, modifications, and combinations may be made within the province of the appended claims without departing in spirit or scope from this invention in its broader aspects.

What we claim as new and desire to secure by Letters Patent of the United States is:

1. A compass-controlled directional gyroscope system, comprising a directional gyroscope indicating azimuth headings by the angular positions of a rotatable member; a magnetic compass transmitter; an electrical detector Selsyn having its rotor coupled with said member and its stator coil coupled with the stator coil of said magnetic compass transmitter; a compensator device including a rotor coupled for rotation with said member, an alternating flux producing arrangement carried by said compensator rotor, a pair of annular windings positioned to intercept flux from said flux producing arrangement, and means for adjusting the proportions of said flux intercepted by each of said windings at predetermined angular positions; torque motor means for precessing said gyroscope; and means for actuating said torque motor means responsive to the combined output signals from said detector Selsyn and said windings.

2. A compass-controlled directional gyroscope system comprising a directional gyroscope indicating azimuth headings by the angular positions of a rotatable member; a magnetic compass transmitter; an electrical detector Selsyn having its rotor coupled with said member and its stator coil coupled with the stator coil of said magnetic compass transmitter; a compensator device including a rotor coupled to rotate with said member, means carried by said rotor for producing alternating flux having the same frequency as the output signals from said detector Selsyn, output windings positioned to intercept flux from said flux producing means when said compensator rotor has predetermined angular orientations, and means for directing the flow of said flux about said windings to regulate the amount of flux linking each of said windings; torque motor means for precessing said gyroscope; and means for actuating said torque motor means responsive to the combined output signals from said detector Selsyn and said windings.

3. In a compass-controlled directional gyroscope system including a directional gyroscope, a magnetic compass, means for detecting variations between the headings of said gyroscope and said compass and for producing output signals characteristic of said variations, and torque motor means for precessing said gyroscope responsive to said output signals applied thereto from said detecting means, the error compensator device comprising means for producing alternating flux signals having the same frequency as said detecting means output signals, winding means intercepting said flux, means for adjusting the reluctances of flux paths about said windings to control the amount of flux linking each of said windings and thereby to control the phase and magnitude of voltages induced in said windings by said flux, said windings and adjusting means and flux producing means being arranged such that said voltages in said windings occur when said gyroscope has predetermined headings, and means applying said winding voltages to said torque motor means in combination with said detecting means output signals.

4. In a compass-controlled directional gyroscope system including a directional gyroscope, a magnetic compass, means for detecting variations between the headings of said gyroscope and compass and for producing output signals characteristic of said variations in phase and magnitude, and torque motor means for precessing said gyroscope responsive to said output signals, the error compensator device comprising a rotor angularly positioned in accordance with the heading of said gyroscope, means rotatable with said rotor for producing alternating flux having the same frequency as said detecting means output signals, a pair of annular windings disposed to intercept flux from said flux producing means and each having a voltage of phase opposite to that of the other induced therein, and adjustable low reluctance means located at predetermined angular positions around said windings for directing the flow of said flux linking each of said windings and to thereby regulate the voltages induced in each winding at said positions, and means applying said winding voltages to said torque motor means in combination with said detecting means output signals.

5. A device for producing compensation signals, comprising a rotor, an electromagnet core mounted for rotation with said rotor, an electromagnet winding for said core excited from an alternating current source, a pair of annular ouput stator windings disposed to have voltages induced therein by the alternating flux from said core, bands of flux conducting material partially enclosing each of said output windings at predetermined positions, adjustable flux-conducting members for dividing in any proportions the amounts of said flux which are conducted by said bands when said core is disposed at said positions, whereby the voltages induced in said windings by said flux conducted by said bands, is adjustable, and means for delivering the combined voltages from said windings to an output circuit.

6. A device for producing compensation signals, comprising a rotor, an open-ended electromagnet core mounted for rotation with said rotor, an electromagnet winding for said core excited from an alternating current source, a pair of spaced annular output windings disposed to have equal voltages induced therein by the alternating flux from the ends of said core, bands of flux conducting material partially enclosing each of said output windings at predetermined positions, said bands being arranged in pairs at said positions such that the open ends of a band about one winding are disposed opposite the open ends of a band about the other winding, flux bridge members adjustable to vary the reluctance between ends of opposite bands at said positions, whereby the voltages induced in each of said windings when said core is near said windings at said positions is adjustable, and means for combining the voltages from said output winding.

7. A device according to claim 6 wherein said output windings are arranged to have voltages of opposite phase induced therein by said flux, said flux bridge members are adjustable to vary the reluctance between diagonally opposite ends of said pairs of flux bands, and said output winding voltages are serially combined.

8. A device for producing compensation signals, comprising a rotor, an electromagnet core mounted for rotation with said rotor, an electromagnet winding cooperating with said core and energized from an alternating current source, a plurality of pairs of output windings disposed to have voltages induced therein by the flux from said core when said rotor has predetermined angular orientations, a band of flux conducting material partially encompassing each winding of said pairs, a flux conducting member cooperating with said bands of each pair of windings to determine the reluctance to said flux of flux paths including said bands, whereby the magnitude of voltage induced in each of said windings is determined, and means combining said output winding voltages.

9. A device according to claim 8 wherein said output windings of each pair are arranged to have voltages of opposite phase induced therein by said flux, and wherein said output winding voltages are serially combined.

10. A device for producing compensation signals, comprising a rotor, means rotatable with said rotor for producing an alternating magnetic flux, means confining said magnetic flux about said flux producing means to a predetermined width, output windings disposed to have voltages induced therein by said flux, bands of flux conducting material partially enclosing each of said windings at predetermined positions, means for adjusting the amount of flux conducted by said bands when said flux is produced at said positions, whereby the voltages induced in said windings by said flux conducted by said bands are adjustable, and means for applying the combined voltages from said windings to an output circuit.

11. A device for producing compensation signals, comprising a rotor, an electromagnet core mounted for rotation with said rotor, an electromagnet winding for said core, means for generating voltage of a predetermined frequency coupled to excite said electromagnet winding, output windings disposed to have voltages induced therein by alternating flux from said core, bands of flux conducting material partially enclosing each of said windings at predetermined positions, means for adjusting the amount of flux conducted by said bands when said core is at said positions, whereby the voltages induced in said windings by said flux conducted by said bands are adjustable, and means for applying the combined voltages from said windings to an output circuit.

12. A device according to claim 11 wherein said generating means comprises a stationary annular saturable core and winding thereon, said winding being excited from a fundamental frequency alternating current source, a permanent magnet positioned proximately with said core, and a second core and winding rotatable with said rotor and disposed to intercept flux from said permanent magnet when said stationary core is saturated, the output of said second winding being coupled to excite said electromagnet winding.

13. A device according to claim 11 wherein said generating means comprises a saturable annular core mounted for rotation with said rotor, a permanent magnet disposed substantially along a diameter of said core, a first winding on said core excited from an alternating current source, and a second winding arrangement on said core including two serially coupled windings, one on each half of said core as divided by said magnet, whereby voltages induced in said arrangement by said first winding are cancelled and second harmonic voltages induced by the permanent magnet flux along said core are added, the output of said winding arrangement being coupled to excite said electromagnet winding.

14. A device for producing compensation signals, comprising a rotor, a saturable core mounted for rotation with said rotor, a winding excited from an alternating current source disposed to periodically saturate said core, a permanent magnet mounted for rotation with said rotor and positioned near said core, output windings disposed to have voltages induced therein by the permanent magnet flux varying in intensity with the degree of saturation of said core, bands of flux conducting material partially enclosing each of said windings at predetermined positions, means for adjusting the amount of said flux conducted by said bands when said core is at said positions, whereby the voltages induced in said windings by said flux conducted by said bands are adjustable, and means for applying the combined voltages from said windings to an output circuit.

15. A device for producing compensation signals, comprising means producing a narrow band of alternating flux and rotatable to orient said band of flux to any angular position about an axis, a pair of stationary windings disposed to have voltages induced therein by said flux, stationary adjustable flux-conducting means disposed proximately with said windings, said flux-conducting means including a flux-conducting member and means which adjustably position said member to any one of positions from one wherein said member directs substantially all of said flux about one of said pair of windings to another wherein said member directs substantially all of said flux about the other of said pair of windings, and means combining said winding voltages.

16. A device for producing compensation signals, comprising a rotor, means rotatable with said rotor producing a narrow band of alternating magnetic flux, a pair of stationary annular windings positioned to intercept said flux, a plurality of adjustable low reluctance means at predetermined angular positions along said annular windings which direct said flux about said windings to induce voltages therein, each of said low reluctance means including a low reluctance member and means which adjustably position said member to any one of positions from one wherein said member directs substantially all of said flux about one of said pair of windings to another wherein said member directs substantially all of said flux about the other of said pair of windings when said rotor positions said flux near said low reluctance means, and means combining said winding voltages.

JOHN E. LUNDBERG.
GEORGE A. WALLACE.

REFERENCES CITED

The following references are of record in the file of this patent:

UNITED STATES PATENTS

| Number | Name | Date |
|---|---|---|
| 2,426,470 | Sinks | Aug. 26, 1947 |
| 2,459,830 | McCarthy | Jan. 25, 1949 |
| 2,460,798 | McCarthy | Feb. 8, 1949 |
| 2,461,238 | Schaevitz | Feb. 8, 1949 |
| 2,507,763 | Caine | May 16, 1950 |